United States Patent
Jeon et al.

(10) Patent No.: US 8,903,614 B1
(45) Date of Patent: Dec. 2, 2014

(54) APPARATUS AND METHOD FOR DETERMINING SHORT-TERM DRIVING TENDENCY

(71) Applicants: Hyundai Motor Company, Seoul (KR); Kia Motors Corporation, Seoul (KR)

(72) Inventors: Byeong Wook Jeon, Whasung-Si (KR); Dong Hoon Jeong, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/144,430

(22) Filed: Dec. 30, 2013

(30) Foreign Application Priority Data

Jun. 7, 2013 (KR) ........................ 10-2013-0065505

(51) Int. Cl.
*F16H 59/50* (2006.01)
*G07C 5/02* (2006.01)

(52) U.S. Cl.
CPC ........................................ *G07C 5/02* (2013.01)
USPC ............................................. 701/57; 701/65

(58) Field of Classification Search
USPC .................................................. 701/57, 58, 65
See application file for complete search history.

(56) References Cited

U.S. PATENT DOCUMENTS

| 2002/0068661 A1* | 6/2002 | Jeon ............................... 477/107 |
| 2009/0312923 A1* | 12/2009 | Mills et al. ........................ 701/57 |
| 2011/0029209 A1* | 2/2011 | Hattori et al. .................... 701/58 |

FOREIGN PATENT DOCUMENTS

| JP | 2002-42288 A | 2/2002 |
| JP | 2003-211999 A | 7/2003 |
| JP | 4480995 B2 | 3/2010 |
| JP | 2012-185582 A | 9/2012 |
| KR | 2002-0089920 A | 11/2002 |
| KR | 10-2012-0000818 A | 1/2012 |
| KR | 10-2012-0121698 A | 11/2012 |

* cited by examiner

*Primary Examiner* — Edwin A Young
(74) *Attorney, Agent, or Firm* — Morgan, Lewis & Bockius LLP

(57) ABSTRACT

An apparatus and a method determines a short-term driving tendency. The apparatus may include a driving information collecting unit configured to collect driving information including a vehicle speed, and an inter-vehicle distance between the vehicle of the driver and a forward vehicle, a short-term driving tendency calculating module configured to receive a plurality of input variables for determining the short-term driving tendency and calculate a short-term driving tendency index using a fuzzy control theory, and a calculation prohibition control module configured to check the inter-vehicle distance between the vehicle of the driver and the forward vehicle and prohibit calculation of the short-term driving tendency index when the inter-vehicle distance is equal to or less than a predetermined reference value.

12 Claims, 3 Drawing Sheets

APPARATUS AND METHOD FOR DETERMINING SHORT-TERM DRIVING TENDENCY

CROSS-REFERENCE TO RELATED APPLICATION

The present application claims priority of Korean Patent Application Number 10-2013-0065505 filed on Jun. 7, 2013, the entire contents of which application are incorporated herein for all purposes by this reference.

BACKGROUND OF INVENTION

1. Field of Invention

The present invention relates to an apparatus and a method for determining a short-term driving tendency of a vehicle driver, and more particularly, to an apparatus and a method for determining a short-term driving tendency which restrict determination of the short-term driving tendency in a running condition in which it is impossible to accurately determine the short-term driving tendency.

2. Description of Related Art

In general, drivers, who drive vehicles, have different and various driving tendencies, respectively. For example, like a driver who drives a vehicle at a high average running speed, a driver using low acceleration and deceleration characteristics compared to other drivers, a driver who performs fuel-efficient driving, or a driver who drives a vehicle over a long distance on a highway mainly on weekends, drivers may have the many different driving tendencies.

Satisfaction of customers regarding running performance of a vehicle depends on how the vehicle runs and coincides with a driving tendency of the driver, but because the premade vehicles generally have predetermined uniform performance characteristics, there is a drawback in that various driving tendencies of the customers are not reflected. Therefore, in recent years, researches on vehicle control technologies based on a driving tendency of the driver, which recognizes the driving tendency of the driver and allows the vehicle to respond suitably to the driving tendency of the driver, are being actively conducted.

In order to provide the vehicle control technology based on the driving tendency of the driver, first, it is very important to accurately determine the driving tendency of the driver. Meanwhile, in the related art, in order to determine an acceleration driving tendency of the driver, a method of calculating the driving tendency of the driver using a specific condition (for example, APS, or AAPS) has been developed.

However, in the method of calculating the driving tendency in the related art, matching results are obtained in a case in which there are no obstacles in front of the vehicle that is being driven, but there is a problem in that it is impossible to recognize a driving tendency of the driver because a vehicle speed is associated with a speed of the forward vehicle regardless of the driving tendency of the driver when the vehicle of the driver follows the forward vehicle running slowly.

In addition, in a case in which the driving tendency of the driver is continuously calculated in a situation in which the vehicle of the driver is affected by the forward vehicle, since the driving tendency of the driver is moved toward a mild direction, there is a problem in that an inaccurate tendency determination numeric value is obtained.

Therefore, in order to provide the vehicle control technology based on the driving tendency of the driver, which shows high satisfaction, a method capable of more accurately determining the driving tendency of the driver is acutely required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an apparatus and a method for determining a short-term driving tendency which restrict determination of the short-term driving tendency in a specific driving condition in which it is impossible to accurately determine the short-term driving tendency when a vehicle is driven.

Various aspects of the present invention provide an apparatus for determining a short-term driving tendency of a driver according to driving a vehicle, including: a driving information collecting unit configured to collect driving information including a vehicle speed, and an inter-vehicle distance between the vehicle of the driver and a forward vehicle; a short-term driving tendency calculating module configured to receive a plurality of input variables for determining the short-term driving tendency and calculate a short-term driving tendency index using a fuzzy control theory; and a calculation prohibition control module configured to check the inter-vehicle distance between the vehicle of the driver and the forward vehicle and prohibit calculation of the short-term driving tendency index when the inter-vehicle distance is equal to or less than a predetermined reference value.

The calculation prohibition control module may set an inter-vehicle distance reference map in which the predetermined reference value increases proportionally to the vehicle speed, determine an inter-vehicle distance condition for the vehicle speed, and transmit a calculation prohibition request signal to the short-term driving tendency calculating module when the inter-vehicle distance condition is satisfied in which the inter-vehicle distance is equal to or less than the predetermined reference value.

The driving information may further include at least one of vehicle acceleration according to driving the vehicle by the driver, an accelerator pedal position, a brake pedal position, a shift-speed, a steering state of the vehicle, position information based on a GPS/GIS, road information, a degree of congestion of a driving section, and weather information.

The short-term driving tendency calculating module may apply the fuzzy control theory to the vehicle speed and the inter-vehicle distance, set at least one membership function for each of the vehicle speed and the inter-vehicle distance, and calculate the short-term driving tendency index, which is a fuzzy result value, from the membership function of the inputted vehicle speed and the inputted inter-vehicle distance from the forward vehicle.

The short-term driving tendency calculating module, based on a membership function of the inter-vehicle distance between the vehicle of the driver and the forward vehicle and a membership function of the vehicle speed, may determine that the driver has a mild driving tendency when the vehicle speed is equal to or less than a first predetermined vehicle speed and the inter-vehicle distance is equal to or greater than a first predetermined distance, and determine that the driver has a sporty driving tendency when the vehicle speed is greater than a second predetermined vehicle speed and the inter-vehicle distance is less than a second predetermined distance.

The calculation prohibition control module may prohibit calculation of the short-term driving tendency index when a road on which the vehicle runs is in a specific road state.

Various other aspects of the present invention provide a method of determining a short-term driving tendency of a driver according to driving a vehicle, including: receiving a plurality of input variables for determining the short-term driving tendency and detecting an inter-vehicle distance between the vehicle of the driver and a forward vehicle from the plurality of input variables; determining whether the inter-vehicle distance satisfies a short-term driving tendency index calculation prohibition condition in which the inter-vehicle distance is equal to or less than a predetermined reference value; and prohibiting calculation of a short-term driving tendency index of the driver when the inter-vehicle distance satisfies the short-term driving tendency index calculation prohibition condition.

The method may further include a vehicle speed from the plurality of input variables, wherein the predetermined reference value increases proportionally to the vehicle speed. In addition, the method may further include initiating, prior to the detecting of the inter-vehicle distance, calculation of the short-term driving tendency index when an accumulated running time or running distance reaches a predetermined condition for initiating the calculation of the short-term driving tendency index after the vehicle is started.

In addition, the method may further include the short-term driving tendency index of the driver when the inter-vehicle distance does not satisfy the short-term driving tendency calculation prohibition condition, wherein the calculating of the short-term driving tendency index, which corresponds to a mild or sporty driving tendency, is conducted by calculating a fuzzy result value from at least one membership function for each of the vehicle speed and the inter-vehicle distance from the forward vehicle.

Still various other aspects of the present invention provide a method of determining a short-term driving tendency of a driver according to driving a vehicle, including: receiving a plurality of input variables for determining the short-term driving tendency and detecting road information according to a vehicle position from the plurality of input variables; determining, based on the road information, whether a load is in a specific road state for prohibiting calculation of a short-term driving tendency index; and prohibiting the calculation of the short-term driving tendency index of the driver when the road is in the specific road state. The specific road state may include at least one of a snowy road, an icy road, a predetermined curved road, a predetermined slope road, a foggy road, and an unpaved road.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
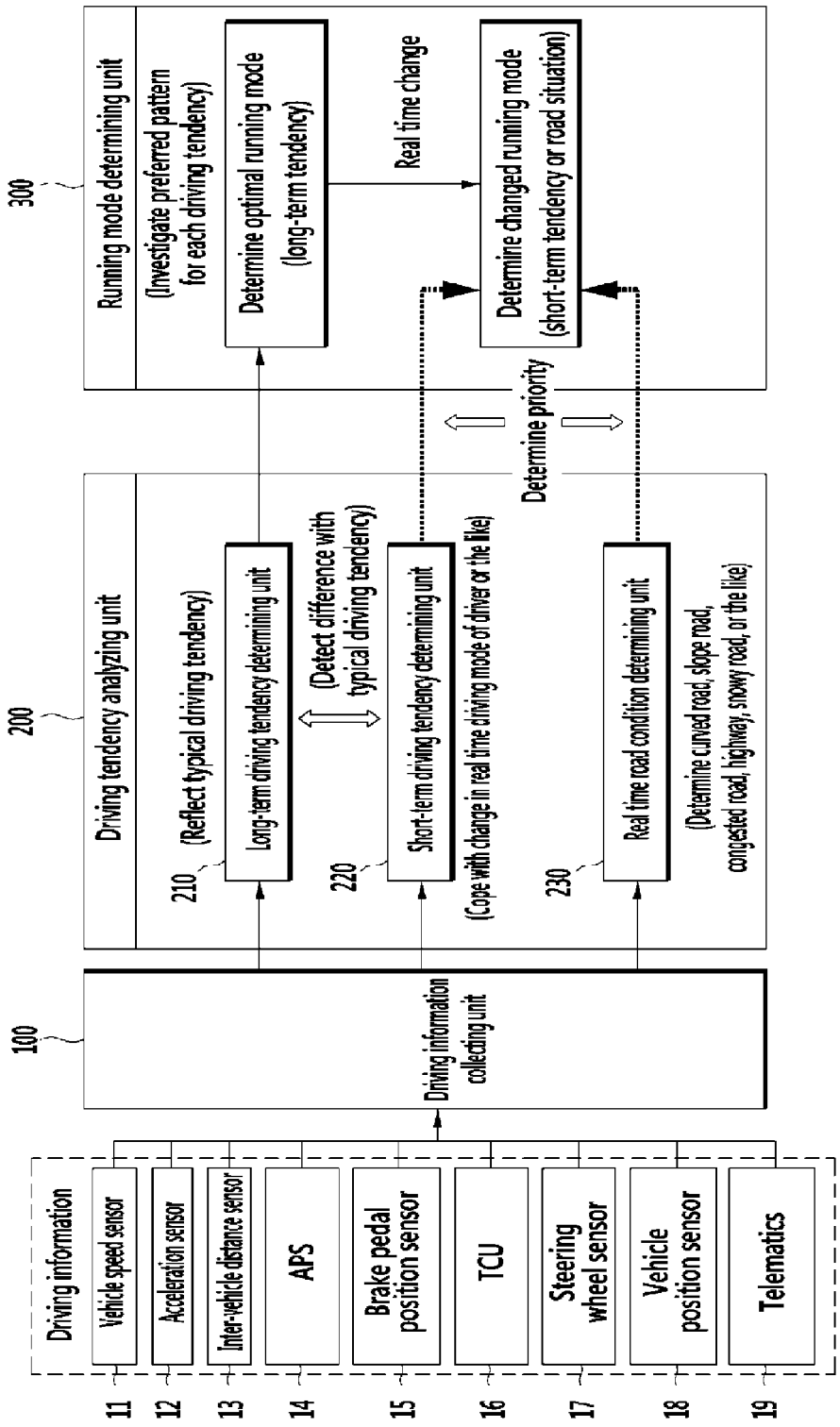
FIG. 1 is a block diagram schematically illustrating a configuration of an exemplary vehicle control system based on a driving tendency according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

FIG. 1 is a block diagram schematically illustrating a configuration of a vehicle control system based on a driving tendency according to various embodiments of the present invention. Referring to the accompanying FIG. 1, a vehicle control system based on a driving tendency includes a driving information collecting unit 100, a driving tendency analyzing unit 200, and a running mode determining unit 300.

The driving information collecting unit 100 detects vehicle driving information that is a basis for determining a driving tendency of a driver, and to this end, the driving information collecting unit 100 is connected to various sensors, controllers, and devices through an internal network of a vehicle. In some cases, an external network may be used.

The driving information collecting unit 100 may collect driving information in conjunction with at least one of a vehicle speed sensor 11, an acceleration sensor 12, an inter-vehicle distance sensor 13, an accelerator pedal position sensor 14, a brake pedal position sensor 15, a TCU 16, a steering wheel sensor 17, a vehicle position sensor (GPS/GIS) 18, and a telematics 19.

The driving information collecting unit 100 collects vehicle speed using the vehicle speed sensor 11, collects acceleration of the vehicle using the acceleration sensor 12, and collects inter-vehicle distances with a forward vehicle using the inter-vehicle distance sensor 13. Here, the inter-vehicle distance sensor 13 may sense a relative distance between the forward vehicle and the present vehicle by utilizing forward radar signals, and additionally, at least one of an infrared sensor and an ultrasonic wave sensor may be used as the inter-vehicle distance sensor 13.

The driving information collecting unit 100 collects an acceleration pattern operation state of the driver using the accelerator pedal position sensor 14, and collects a brake operation state using the brake pedal position sensor 15. Here, it is possible to detect acceleration and deceleration tendencies of the driver using operation patterns of the accelerator pedal position sensor 14 and the brake pedal position sensor 15.

The driving information collecting unit 100 collects shift-speeds using the transmission control unit (TCU) 16, and collects steering states of the vehicle using the steering wheel sensor 17.

The driving information collecting unit 100 may collect vehicle position information based on the GPS/GIS and information on a road type, a degree of curve, and a degree of slope, using the vehicle position sensor 18, and collect a degree of congestion and weather information (for example, a snowy road, a rainy road, or a foggy road) of a driving section using the telematics 19.

Here, the telematics 19 refers to a terminal in which functions of a mobile telematics system (MTS) terminal, which is called a MOZEN, a car ubiquitous system (CUbiS) terminal, which is called an auto care, a blue link (emergency situation service), and a navigation terminal are integrated, and supports wireless network communication (for example, 3G or 4G) of the vehicle.

The driving tendency analyzing unit 200 determines the driving tendency of the driver by analyzing the vehicle driving information of the driver, which is collected by the driving information collecting unit 100, and includes a long-term driving tendency determining unit 210, a short-term driving tendency determining unit 220, and a real time road condition determining unit 230.

The long-term driving tendency determining unit 210 accumulates the vehicle driving information of the driver for a predetermined long period or by a predetermined number of driving times, calculates a long-term driving tendency index with a probability value based on normal distribution by comparing and analyzing an average value of the accumulated driving information, and reflects the long-term driving tendency index to a typical driving tendency.

Meanwhile, the tendency of the driver is not always uniform, and may be changed in accordance with changes of the mood of the driver, sudden changes in driving intention, a road condition, or the like.

The short-term driving tendency determining unit 220 according to various embodiments of the present invention calculates a short-term driving tendency index for determining a short-term driving intention of the driver as an objective numeric value using a fuzzy control theory.

Here, the short-term driving tendency has a meaning compared to the long-term driving tendency, and is a reference for determining the driver's sudden intention to accelerate and decelerate the vehicle. That is, a real time driving tendency of the driver is objectified by quantitatively digitizing a driving operation form that is shown by a comparatively short time unit in comparison with the long-term driving tendency. The short-term driving tendency may be utilized as a reference value for automatically converting control factors, which are involved in the feel of acceleration, fuel consumption, the feel of shifting, and the like, for an optimal driving condition.

The real time road condition determining unit 230 analyzes a curved road, a slope road, a congested road, a highway, a snowy road, or the like according to the weather information, which affect the vehicle driving, and the vehicle position information based on the GPS/GIS. Here, the analyzed real time road condition may be reflected to determine a running mode according to a tendency of a customer.

The running mode determining unit 300 investigates a preferred pattern for each driving tendency of the driver, and determines an optimal running mode by reflecting a typical long-term driving tendency. For example, the running mode determining unit 300 may determine an eco-drive mode or a sports mode based on a personal driving tendency index of the driver.

In addition, the running mode determining unit 300 reflects the short-term driving tendency to the optimal running mode based on the long-term driving tendency of the driver, thereby determining a changed running mode according to change of the mood of the driver or sudden changes in driving intention.

In addition, the running mode determining unit 300 may determine a changed running mode according to a road situation by further considering a real time road situation in addition to the optimal running mode, and for example, may determine various running modes such as a downtown mode considering the vehicle driving section and a mode for each commuting section.

Meanwhile, a process of determining the driving tendency of the driver and differentiating the feel of shifting, a shift pattern, an engine torque map, an engine filter, and the like is a very important factor in terms of customization of running performance, and the short-term driving tendency determining unit 220 is suggested as a basic constituent element to determine the driving tendency, as described above.

However, as discussed in the description of the related art, because a speed of the vehicle of the driver is associated with a speed of the forward vehicle regardless of the driving tendency of the driver when the vehicle of the driver follows the forward vehicle running slowly, there is a problem in that it is impossible to recognize the driving tendency of the driver or an inaccurate determination result is obtained.

Therefore, a short-term driving tendency determining unit including a function of restricting determination of the short-term driving tendency is very desirable and a configuration of the short-term driving tendency determining unit 220 including a function of restricting determination of the short-term driving tendency according to various embodiments of the present invention will be described with reference to FIG. 2.

Figure 2:
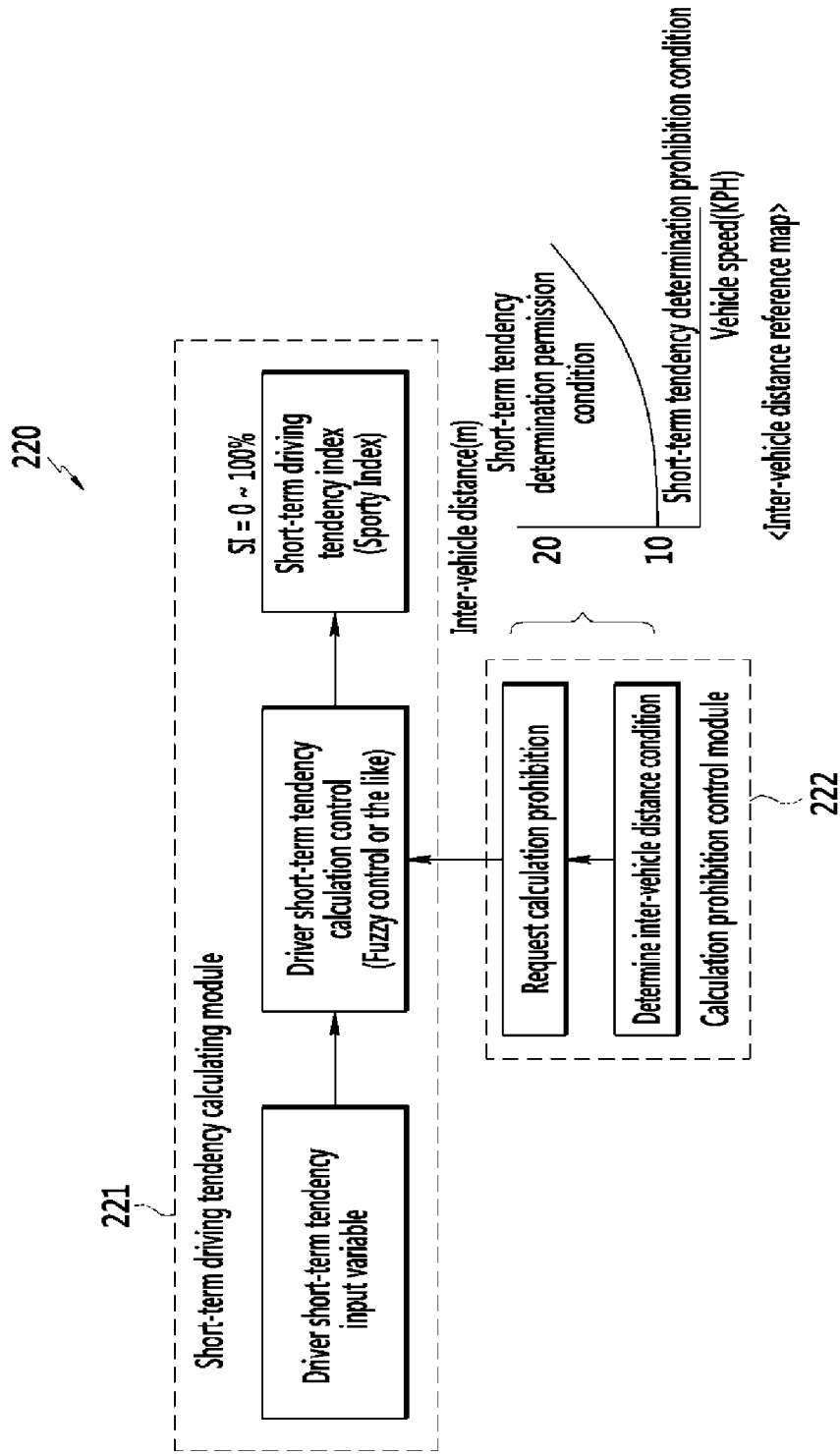
FIG. 2 is a block diagram schematically illustrating a configuration of an exemplary short-term driving tendency determining unit according to the present invention.

FIG. 2 is a block diagram schematically illustrating the configuration of the short-term driving tendency determining unit according to various embodiments of the present invention. Referring to the accompanying FIG. 2, the short-term driving tendency determining unit 220 includes a short-term driving tendency calculating module 221, and a calculation prohibition control module 222.

The short-term driving tendency calculating module 221 receives an input variable for determining the short-term driving tendency of the driver from the driving information collecting unit 100, and calculates a short-term driving tendency index (sporty index) for determining the short-term driving intention of the driver as an objective numeric value using the fuzzy control theory.

Specifically, the short-term driving tendency calculating module 221 applies the fuzzy control theory to a vehicle speed and an inter-vehicle distance, and sets at least one membership function for each of the vehicle speed and the inter-vehicle distance. Further, the short-term driving tendency calculating module 221 calculates the short-term driving tendency index (e.g., SI=0 to 100%), which is a fuzzy result value, from the membership function of the collected vehicle speed and the membership function of the collected inter-vehicle distance from the forward vehicle.

Here, a fuzzy rule for determining the driving tendency may be defined as in the following examples. For instance, a state of the input variables is defined as and denoted by a "low" state, a "middle" state or a "high" state due to characteristics of fuzzy control, but is not limited thereto.

Based on the membership function of the inter-vehicle distance between the vehicle of the driver and the forward vehicle and the membership function of the vehicle speed, when the vehicle speed is "low" (e.g., equal to or less than a first predetermined speed) and the inter-vehicle distance is "high" (e.g., equal to or greater than a first predetermined distance), the short-term driving tendency calculating module 221 may determine that the driver has a mild driving tendency. In contrast, when the vehicle speed is "high" (e.g., greater than a second predetermined vehicle speed) and the inter-vehicle distance is "low" (e.g., less than a second predetermined distance), the short-term driving tendency calculating module 221 may determine that the driver has a sporty driving tendency.

That is, it may be determined that the driver, who maintains a large inter-vehicle distance from the forward vehicle and has a defensive driving pattern, has the mild driving tendency, and the driver, who maintains a small inter-vehicle distance from the forward vehicle and has an aggressive driving pattern, has the sporty driving tendency.

Meanwhile, the calculation prohibition control module 222 checks the inter-vehicle distance between the vehicle that is driven by the driver and the forward vehicle, and prohibits calculation of the short-term driving tendency of the driver under a condition in which the inter-vehicle distance is equal to or less than a predetermined reference value.

The calculation prohibition control module 222 sets an inter-vehicle distance reference map in which the predetermined reference value increases proportionally to a vehicle speed, determines an inter-vehicle distance condition for each vehicle speed, and transmits a calculation prohibition request signal to the short-term driving tendency calculating module 221 when the inter-vehicle distance satisfies a condition in which the inter-vehicle distance is equal to or less than the predetermined reference value (a short-term driving tendency calculation prohibition condition).

That is, the calculation prohibition control module 222 sets an inter-vehicle distance reference for prohibiting determination of the short-term driving tendency to be associated with the vehicle speed, and sets an inter-vehicle distance reference for prohibiting calculation to be proportionally increased as the vehicle speed is increased.

Therefore, there are advantages in that inaccurate noise elements may be reduced and a more accurate short-term driving tendency of the driver may be obtained by differentiating states of a low speed congested road and a high speed driving road from each other.

Meanwhile, a method of restricting determination of the short-term driving tendency of the driver based on the configuration of the short-term driving tendency determining unit 220 according to various embodiments of the present invention will be described.

Figure 3:
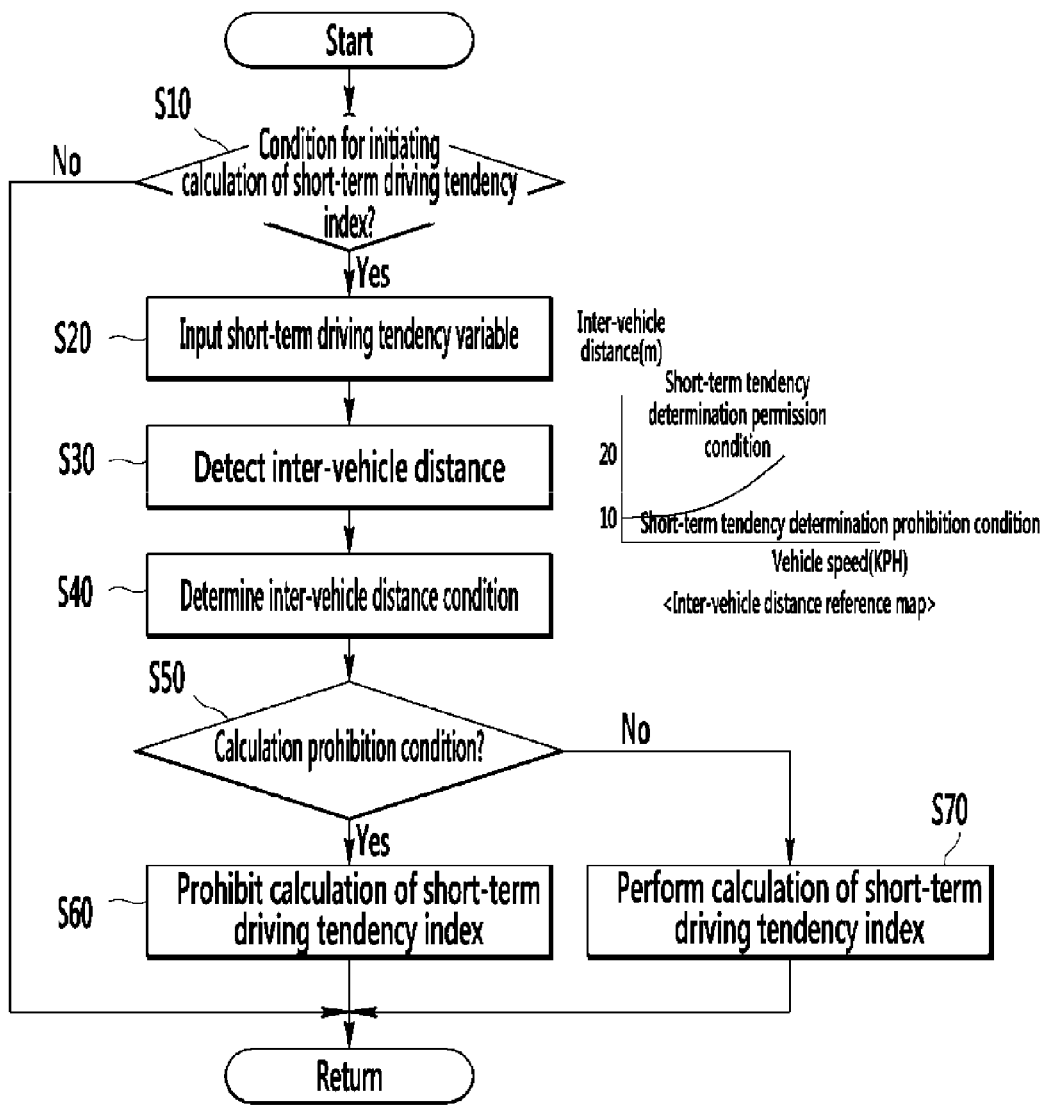
FIG. 3 is a flowchart illustrating an exemplary method of restricting determination of a short-term driving tendency according to the present invention.

FIG. 3 is a flowchart illustrating a method of restricting determination the short-term driving tendency according to various embodiments of the present invention. Referring to the accompanying FIG. 3, the short-term driving tendency determining unit 220 initiates calculation of the short-term driving tendency when an accumulated running time or running distance reaches a predetermined condition for initiating the calculation of the short-term driving tendency index after the vehicle of the driver is started (S10; Yes).

In this case, the short-term driving tendency determining unit 220 may set a condition for initiating determination of the short-term driving tendency for a current running time (and/or distance) or for a predetermined time (and/or distance) while the vehicle currently runs, and initiate the determination of the short-term driving tendency of the driver in real time when the corresponding condition is satisfied.

The short-term driving tendency determining unit 220 receives the input variables for determining the short-term driving tendency of the driver from the driving information collecting unit 100 (S20), and detects the inter-vehicle distance from the forward vehicle from the input variables (S30). The short-term driving tendency determining unit 220 determines whether the short-term driving tendency index calculation prohibition condition, in which the inter-vehicle distance from the forward vehicle is equal to or less than the predetermined reference value, is satisfied (S40).

In this case, the short-term driving tendency determining unit 220 may further detect the present vehicle speed as well as the inter-vehicle distance as the input variable, determine the inter-vehicle distance condition for each vehicle speed based on the inter-vehicle distance reference map, and determine whether the inter-vehicle distance satisfies the short-term driving tendency calculation prohibition condition in which the inter-vehicle distance is equal to or less than the predetermined reference value.

When the inter-vehicle distance from the forward vehicle satisfies the short-term driving tendency index calculation prohibition condition (S50: Yes), the short-term driving tendency determining unit 220 prohibits calculation of the short-term driving tendency index of the driver and is returned (S60).

In contrast, in step S50, when the inter-vehicle distance from the forward vehicle is greater than the predetermined reference value and does not satisfy the short-term driving tendency calculation prohibition condition (S50: No), the short-term driving tendency determining unit 220 performs calculation of the short-term driving tendency index of the driver and is returned (S70).

In this case, the driving tendency determining unit 220 may calculate the fuzzy result value from the membership function of the vehicle speed and the membership function of the inter-vehicle distance from the forward vehicle, so as to calculate the short-term driving tendency index (SI=0 to 100%) that corresponds to the mild or sporty driving tendency.

As such, according to various embodiments of the present invention, by prohibiting calculation of the short-term driving tendency of the driver under a condition in which the inter-vehicle distance is equal to or less than a specific inter-vehicle distance that is set for each vehicle speed, there is an effect in that it is possible to prevent an inaccurate driving tendency determination in a situation in which a speed of the vehicle of the driver is associated with a speed of the forward vehicle.

In addition, since the inter-vehicle distance reference for prohibiting the calculation is set to be larger as the vehicle speed becomes higher, e.g., proportionally to the vehicle speed, there is an effect in that a more accurate short-term driving tendency of the driver may be obtained by differentiating states of a low-speed congested road and a high-speed driving road from each other.

In addition, since the vehicle driving tendency of the driver is recognized based on the driving information of the driver, and the customized running mode, which coincides with the driving tendency of the individual driver, is provided, it is possible to expect effects of enhance emotional values of the customer and improving a corporate image.

While the exemplary embodiments of the present invention have been described, the present invention is not limited to the aforementioned exemplary embodiments, and other various modifications may be made. For example, while the exemplary embodiment of the present invention illustrated in FIG. 2 describes that the calculation prohibition control module 222 prohibits calculation of the short-term driving tendency index using a vehicle speed condition and an inter-vehicle distance condition, the present invention is not limited thereto, and the calculation prohibition control module 222 may prohibit the calculation of the short-term driving tendency index in accordance with a road condition.

That is, a road condition with respect to a specific road state such as a snowy road, an icy road, a rough road (for example, a predetermined curved road or a predetermined slope road on a navigation map), a foggy road, and an unpaved road is set, and when a real time road state satisfies the road condition with respect to the specific road state, the calculation prohibition control module 222 may prohibit calculation of the short-term driving tendency index in conjunction with the real time road condition determining unit 230.

In addition, by applying the aforementioned short-time calculation prohibition control according to the inter-vehicle distance and the road condition to the long-term driving tendency determining unit 210, the calculation prohibition control module 222 may prevent inaccurate driving tendency determination information from being reflected when determining an optimal running mode based on the long-term driving tendency.

The exemplary embodiments of the present invention are not implemented only by the apparatus and/or method described above, but may also be implemented by a program for realizing a function corresponding to the configuration of the exemplary embodiments of the present invention, and recording media on which the program is recorded, and the implementation may be easily made from the disclosure of the exemplary embodiments described above by a skill in the art to which the present invention pertains.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for determining a short-term driving tendency of a driver driving a vehicle, comprising:
    a driving information collecting unit configured to collect driving information including a vehicle speed, and an inter-vehicle distance between the vehicle of the driver and a forward vehicle;
    a short-term driving tendency calculating module configured to receive a plurality of input variables for determining the short-term driving tendency and calculate a short-term driving tendency index using a fuzzy control theory; and
    a calculation prohibition control module configured to check the inter-vehicle distance between the vehicle of the driver and the forward vehicle and prohibit calculation of the short-term driving tendency index when the inter-vehicle distance is equal to or less than a predetermined reference value.

2. The apparatus of claim 1, wherein the calculation prohibition control module:
    sets an inter-vehicle distance reference map in which the predetermined reference value increases proportionally to the vehicle speed,
    determines an inter-vehicle distance condition for the vehicle speed, and
    transmits a calculation prohibition request signal to the short-term driving tendency calculating module when the inter-vehicle distance condition is satisfied in which the inter-vehicle distance is equal to or less than the predetermined reference value.

3. The apparatus of claim 1, wherein the driving information further includes at least one of vehicle acceleration according to driving the vehicle by the driver, an accelerator pedal position, a brake pedal position, a shift-speed, a steering state of the vehicle, position information based on a GPS/GIS, road information, a degree of congestion of a driving section, and weather information.

4. The apparatus of claim 1, wherein the short-term driving tendency calculating module:
    applies the fuzzy control theory to the vehicle speed and the inter-vehicle distance,
    sets at least one membership function for each of the vehicle speed and the inter-vehicle distance, and
    calculates the short-term driving tendency index, which is a fuzzy result value, from the membership function of the inputted vehicle speed and the inputted inter-vehicle distance.

5. The apparatus of claim 1, wherein the short-term driving tendency calculating module, based on a membership function of the inter-vehicle distance between the vehicle of the driver and the forward vehicle and a membership function of the vehicle speed,
    determines that the driver has a mild driving tendency when the vehicle speed is equal to or less than a first predetermined vehicle speed and the inter-vehicle distance is equal to or greater than a first predetermined distance, and
    determines that the driver has a sporty driving tendency when the vehicle speed is greater than a second predetermined vehicle speed and the inter-vehicle distance is less than a second predetermined distance.

6. The apparatus of claim 1, wherein the calculation prohibition control module prohibits calculation of the short-term driving tendency index when a road on which the vehicle runs is in a specific road state.

7. A method of determining a short-term driving tendency of a driver driving a vehicle, comprising:
    receiving a plurality of input variables for determining the short-term driving tendency and detecting an inter-vehicle distance between the vehicle of the driver and a forward vehicle from the plurality of input variables;
    determining whether the inter-vehicle distance satisfies a short-term driving tendency index calculation prohibition condition in which the inter-vehicle distance is equal to or less than a predetermined reference value; and
    prohibiting calculation of a short-term driving tendency index of the driver when the inter-vehicle distance satisfies the short-term driving tendency index calculation prohibition condition.

8. The method of claim 7, further comprising:
    detecting a vehicle speed from the plurality of input variables, wherein the predetermined reference value increases proportionally to the vehicle speed.

9. The method of claim 7, further comprising:
    initiating, prior to the detecting of the inter-vehicle distance, calculation of the short-term driving tendency index when an accumulated running time or running distance reaches a predetermined condition for initiating the calculation of the short-term driving tendency index after the vehicle is started.

10. The method of claim 7, further comprising:
calculating the short-term driving tendency index of the driver when the inter-vehicle distance does not satisfy the short-term driving tendency calculation prohibition condition, wherein the calculating of the short-term driving tendency index, which corresponds to a mild or sporty driving tendency, is conducted by calculating a fuzzy result value from at least one membership function for each of the vehicle speed and the inter-vehicle distance from the forward vehicle.

11. A method of determining a short-term driving tendency of a driver driving a vehicle, comprising:
receiving a plurality of input variables for determining the short-term driving tendency and detecting road information according to a vehicle position from the plurality of input variables;
determining, based on the road information, whether a load is in a specific road state for prohibiting calculation of a short-term driving tendency index; and
prohibiting the calculation of the short-term driving tendency index of the driver when the road is in the specific road state.

12. The method of claim 11, wherein the specific road state includes at least one of a snowy road, an icy road, a predetermined curved road, a predetermined slope road, a foggy road, and an unpaved road.

* * * * *